United States Patent
Lan

(10) Patent No.: US 10,100,256 B2
(45) Date of Patent: Oct. 16, 2018

(54) LIGAND-MODIFIED QUANTUM DOT MATERIALS, METHODS OF FABRICATING LIQUID CRYSTAL DISPLAY PANELS AND LIQUID CRYSTAL DISPLAY PANELS

(71) Applicant: Shenzhen China Star Optoelectronics Technology Co., Ltd., Shenzhen (CN)

(72) Inventor: Song Lan, Shenzhen (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 232 days.

(21) Appl. No.: 15/106,838

(22) PCT Filed: May 13, 2016

(86) PCT No.: PCT/CN2016/082127
§ 371 (c)(1),
(2) Date: Jun. 21, 2016

(87) PCT Pub. No.: WO2017/181459
PCT Pub. Date: Oct. 26, 2017

(65) Prior Publication Data
US 2018/0079960 A1 Mar. 22, 2018

(30) Foreign Application Priority Data
Apr. 22, 2016 (CN) .......................... 2016 1 0257620

(51) Int. Cl.
*C09K 19/56* (2006.01)
*C09K 11/02* (2006.01)
(Continued)

(52) U.S. Cl.
CPC .............. *C09K 19/56* (2013.01); *C09K 11/02* (2013.01); *C09K 11/025* (2013.01);
(Continued)

(58) Field of Classification Search
CPC .... C09K 19/56; C09K 11/025; C09K 11/881; C09K 11/883; G02F 1/133617;
(Continued)

(56) References Cited

U.S. PATENT DOCUMENTS

2015/0002788 A1* 1/2015 Guo .................. G02F 1/133603
349/69
2015/0252265 A1 9/2015 Archetti et al.

FOREIGN PATENT DOCUMENTS

CN 105278155 A 1/2016

* cited by examiner

*Primary Examiner* — Ruiyun Zhang
(74) *Attorney, Agent, or Firm* — Leong C. Lei

(57) ABSTRACT

The present application provides a ligand-modified quantum dot material, a method of fabricating a liquid crystal display panel, and a liquid crystal display panel. The ligand-modified quantum dot material of the present application can occur a polymerization with the ligand-modified quantum dot material under ultraviolet irradiation to form a polymer, while the polymer deposits on a substrate to form a polymer film, which can replace the PI alignment film, so that an alignment process of liquid crystal is simplified, and a cost is economized; simultaneously, display quality of a liquid crystal display panel can be improved by the quantum dots anchored in the polymer film. The method of fabricating the liquid crystal display panel of the present application eliminates the fabricating process of the PI alignment film, the method has simple process and low cost, and a liquid crystal display panel obtained thereby has better display quality. The liquid crystal display panel of the present application utilizes the polymer film, which is obtained by polymerizing the ligand-modified quantum dot material and a polymerizable monomer, to replace the PI alignment film, so as to greatly enhance quality of the panel, and to have a low fabricating cost.

10 Claims, 7 Drawing Sheets

(51) Int. Cl.
*C09K 19/52* (2006.01)
*G02F 1/1337* (2006.01)
*C09K 11/88* (2006.01)
*G02F 1/1335* (2006.01)
*G02F 1/1343* (2006.01)
G02F 1/1341 (2006.01)
C09K 19/04 (2006.01)
C09K 19/30 (2006.01)

(52) U.S. Cl.
CPC .......... *C09K 11/881* (2013.01); *C09K 11/883* (2013.01); *C09K 19/52* (2013.01); *G02F 1/1337* (2013.01); *G02F 1/133617* (2013.01); *G02F 1/134309* (2013.01); *C09K 2019/0448* (2013.01); *C09K 2019/301* (2013.01); *C09K 2019/3016* (2013.01); *G02F 1/1341* (2013.01); *G02F 2001/13415* (2013.01); *G02F 2202/36* (2013.01); *Y10T 428/10* (2015.01); *Y10T 428/1005* (2015.01)

(58) Field of Classification Search
CPC .. G02F 1/1337; G02F 1/1341; G02F 2202/36; Y10T 428/10; Y10T 428/1005; Y10T 428/1009
USPC ............................ 428/1.1, 1.2, 1.21; 349/123
See application file for complete search history.

LIGAND-MODIFIED QUANTUM DOT MATERIALS, METHODS OF FABRICATING LIQUID CRYSTAL DISPLAY PANELS AND LIQUID CRYSTAL DISPLAY PANELS

FIELD OF THE INVENTION

The present application relates to display technology field, especially to a ligand-modified quantum dot material, a method of fabricating a liquid crystal display panel, and a liquid crystal display panel.

BACKGROUND OF THE INVENTION

With the development of the display technology, due that flat display devices of liquid crystal displays (LCD) and the like have advantages of high definition, power saving, thin body, wide range application etc., the flat display devices are widely applied to various consumer electronic products of mobile phones, televisions, personal digital assistants, notebook computers, desktop computers and the like, so as to be the mainstream of the display devices.

Most of the liquid crystal devices in current market are backlight type liquid crystal display, which includes a liquid crystal display panel and a backlight module. The working principle of the liquid crystal display panel is: placing liquid crystal molecules in two parallel glass substrates, which have many vertical and horizontal fine wires between the two glass substrates; controlling the liquid crystal molecules to change direction by energizing or not energizing; and refracting light of the backlight module to produce frames.

Generally, the liquid crystal display panel is consisting of a color filter (CF) substrate, a thin film transistor (TFT) substrate, liquid crystal interposed between the CF substrate and the TFT substrate, and a sealant.

A thin film material is respectively formed on the CF substrate and the TFT substrate in the liquid crystal display, a main action of the thin film material is to arrange for the liquid crystal molecules according to a certain direction, the thin film material, we call an alignment film, usually is polyimide (PI) material. A main composition of this type alignment film is a rubbing alignment type PI material or an optical alignment type PI material; however, no matter what the type of alignment material is, it has its own shortcoming. Firstly, the rubbing alignment type PI material easily causes problems of dust particles, residual electrostatic, and brush mark etc.; thereby reducing process yield. Although the optical alignment PI material can obviate such problems, it has limited material characteristics, poor heat resistance, poor aging resistance, and weaker ability of anchoring liquid crystal molecules; thereby affecting panel quality. Secondly, the PI material itself has high polarity and high water absorption, storage and transport easily cause deterioration that results in uneven alignment, and the price of PI material is expensive, the process of forming a film on the TFT-LCD is complex; thereby increasing panel cost.

However, in addition to the action of aligning the liquid crystal, the alignment film can prevent ions and other impurities in the upper and lower substrates to diffuse in the liquid crystal to affect the liquid crystal quality. Therefore, if the alignment film in the liquid crystal display panel is eliminated, the liquid crystal molecules cannot be arranged; further, the panel quality is greatly attenuated.

Currently, a new material of quantum dot brings new color development space for the display industry by its excellent luminescence characteristic. The quantum dot with its excellent luminescence performance such as narrow luminescence peak, tunable luminescence band, high inner quantum efficiency, open a more colorful chapter for the display industry. A quantum dot liquid crystal material is an important class of the liquid crystal material; however, to add the quantum dots into the liquid crystal has problems of uneven diffusion, easily precipitating in the liquid crystal, and low luminescence efficiency.

SUMMARY OF THE INVENTION

A primary aspect of the present application is to provide a ligand-modified quantum dot material, which can occur a polymerization with a polymerizable monomer to form a polymer, the polymer deposits on a substrate to form a polymer film, which can replace the PI alignment film, so that an alignment process of liquid crystal is simplified, a cost is economized; simultaneously, display quality of a liquid crystal display panel can be improved.

Another aspect of the present application is to provide a method of fabricating a liquid crystal display panel. The method eliminates a fabricating process of the PI alignment film, has simple process and low cost, and a liquid crystal display panel obtained thereby has better display quality.

A further aspect of the present application is to provide a liquid crystal display panel utilizing a polymer film, which is obtained by polymerizing the ligand-modified quantum dot material and a polymerizable monomer, to replace the PI alignment film, so as to greatly enhance quality of the panel, and to have a low fabricating cost.

To achieve the aforesaid aspects, the present application provides a ligand-modified quantum dot material, including: quantum dots and a ligand modifier adsorbing surfaces of the quantum dots; a structural formula of the ligand modifier being A-B-R, the ligand modifier adsorbing the surface of the quantum dots through group A;

wherein A refers —SH, —NH$_2$, —NH—, or —COOH;

B refers

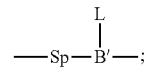

Sp refers group —(CH$_2$)$_n$—, or a group obtained by a —CH$_2$— in the group —(CH$_2$)$_n$— substituted with —O—, —S—, —CO—, —CO—O—, —O—CO—, —O—CO—O—, —OCH$_2$—, —CH$_2$O—, —CH=CH—, —CF=CF—, —C≡C—, —CH=CH—COO—, or —OCO—CH=CH—, wherein n is an integer 1~8;

B' refers

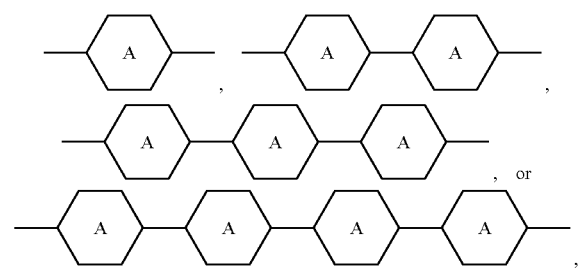

wherein

is phenyl, a group obtained by H atom of phenyl substituted with F, Cl, Br, I, —CN, —NO₂, or —C(=O)H, or cycloalkyl; R refers alkyl of straight chain or branched chain having 5~20 C atoms, a first group obtained by a —CH₂— in the alkyl substituted with phenyl, cycloalkyl, —CONH—, —COO—, —O—CO—, —S—, —CO—, or —CH=CH—, a second group obtained by an H atom in the alkyl substituted with F or Cl atom, or a third group obtained by an H atom in the first group substituted with F or Cl atom;

L refers a polymerizable group connecting to group B', and includes any one, any two, or any three of following three groups:

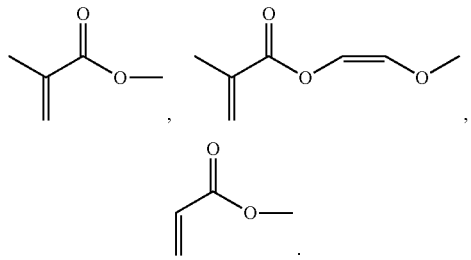

The ligand modifier includes one or more than one of following compounds:

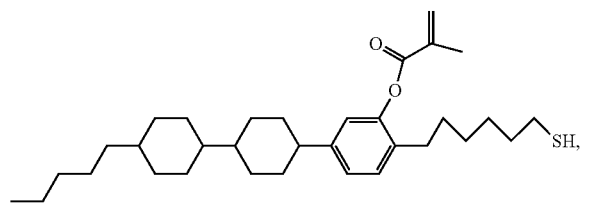

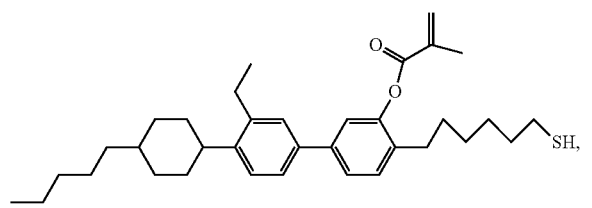

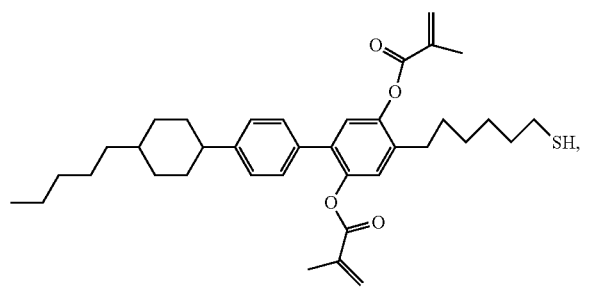

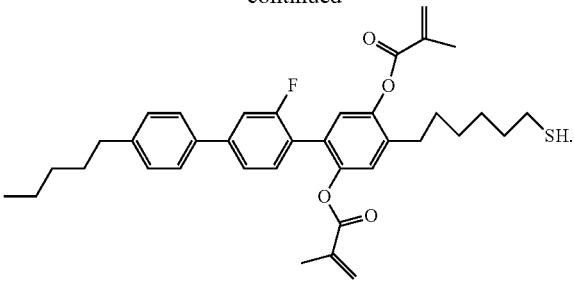

The present application further provides a method of fabricating a liquid crystal display panel, including following steps:

step 1, providing an upper substrate, a lower substrate, and a liquid crystal material;

the upper substrate includes a first substrate, and a first electrode disposed on the first substrate; the lower substrate includes a second substrate, and a second electrode disposed on the second substrate;

the liquid crystal material includes liquid crystal molecules, a ligand-modified quantum dot material, and a polymerizable monomer;

the ligand-modified quantum dot material includes quantum dots, and the ligand modifier adsorbing surfaces of the quantum dots; a structural formula of the ligand modifier is A-B-R, the ligand modifier adsorbs the surfaces of the quantum dots through group A;

wherein A refers —SH, —NH₂, —NH—, or —COOH;
B refers

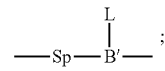

Sp refers group —(CH₂)$_n$—, or a group obtained by a —CH₂— in the group —(CH₂)$_n$— substituted with —O—, —S—, —CO—, —CO—O—, —O—CO—, —O—CO—O—, —OCH₂—, —CH₂O—, —CH=CH—, —CF=CF—, —C≡C—, —CH=CH—COO—, or —OCO—CH=CH—, wherein n is an integer 1~8;
B' refers

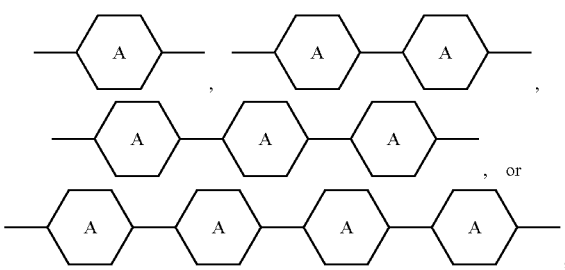

wherein

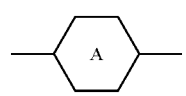

is phenyl, a group obtained by H atom of phenyl substituted with F, Cl, Br, I, —CN, —NO₂, or —C(=O)H, or cycloalkyl;

R refers alkyl of straight chain or branched chain having 5~20 C atoms, a first group obtained by a —CH₂— in the alkyl substituted with phenyl, cycloalkyl, —CONH—, —COO—, —O—CO—, —S—, —CO—, or —CH=CH—, a second group obtained by an H atom in the alkyl substituted with F or Cl atom, or a third group obtained by an H atom in the first group substituted with F or Cl atom;

L refers a polymerizable group connecting to group B', and includes any one, any two, or any three of following three groups:

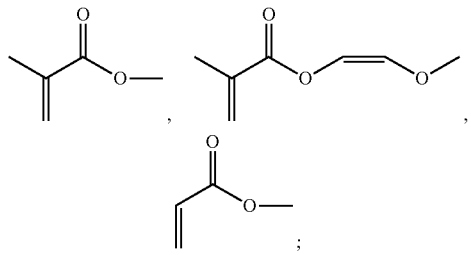

step 2, dripping a liquid crystal material on the upper substrate or the lower substrate, coating a sealant on a peripheral position of the upper substrate or the lower substrate, then assembling and laminating the upper substrate and the lower substrate, and curing the sealant;

due the ligand-modified quantum dot material in the liquid crystal material is hard to be soluble in liquid crystal molecules, the ligand-modified quantum dot material thus deposits on the upper substrate and the lower substrate, and the ligand-modified quantum dot material guides the liquid crystal molecules arranging perpendicular to the upper substrate and the lower substrate through group B-R on the ligand modifier;

step 3, applying a voltage to both sides of the liquid crystal material through the first electrode and the second electrode, to allow the liquid crystal molecules occurring deflection and arranging along a direction inclined to the upper substrate and the lower substrate;

step 4, under the condition of applying the voltage to the liquid crystal material, irradiating ultraviolet to the liquid crystal material from a side of the upper substrate or the lower substrate, to allow the ligand-modified quantum dot material in the liquid crystal material occurring a polymerization with the polymerizable monomer through the ligand modifier on the ligand-modified quantum dot material to form a polymer, wherein the polymer deposits on the upper substrate toward a side of the liquid crystal material to form a first polymer film, and simultaneously deposits on the lower substrate toward a side of the liquid crystal material to form a second polymer film, surfaces of both the first polymer film and the second polymer film have polymer projections, so as to allow the liquid crystal molecules around the first polymer film and the second polymer film maintain the inclined direction thereof in a steric hindrance manner, after the voltage is removed;

constituting a liquid crystal layer by the liquid crystal material in which the ligand-modified quantum dot material and the polymerizable monomers are removed.

The ligand modifier includes one or more than one of following compounds:

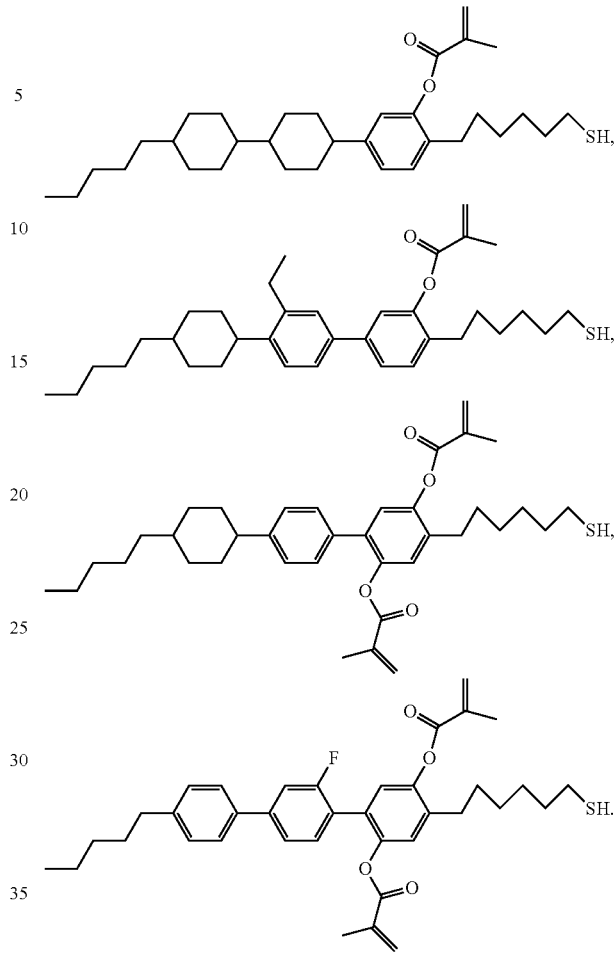

In the liquid crystal material, a mass percentage of the liquid crystal molecules is 93.0%~99.4%, a mass percentage of the ligand-modified quantum dot material is 0.5%~5.0%, a mass percentage of the polymerizable monomer is 0.01%~2.0%.

In step 3, the voltage applied to the both sides of the liquid crystal material is 13~25V; in the irradiating ultraviolet of step 4, an illumination intensity of the ultraviolet is 85~100 mW/cm², an irradiation time is 20~30 min.

Thicknesses of the first polymer film and the second polymer film are 100~1200 Å.

The present application further provides a liquid crystal display panel, including: oppositely disposed an upper substrate and a lower substrate, a liquid crystal layer disposed between the upper substrate and the lower substrate, a first polymer film disposed on the upper substrate toward a side surface of the liquid crystal layer, and a second polymer film disposed on the lower substrate toward a side surface of the liquid crystal layer; wherein the upper substrate includes a first substrate and a first electrode disposed on the first substrate; the lower substrate includes a second substrate and a second electrode disposed on the second substrate;

the liquid crystal layer includes liquid crystal molecules;

both the first polymer film and the second polymer film can be formed by polymerizing the polymerizable monomer and the ligand-modified quantum dot material, and surfaces of both the first polymer film and the second polymer film have polymer projections, so as to allow the liquid crystal molecules near the first polymer film and the second polymer film arrange along a direction inclined to the upper substrate and the lower substrate;

the ligand-modified quantum dot material includes quantum dots, and a ligand modifier adsorbs surfaces of the quantum dots; a structural formula of the ligand modifier is A-B-R, the ligand modifier adsorbs the surfaces of the quantum dots through group A;

wherein A refers —SH, —NH$_2$, —NH—, or —COOH;

B refers

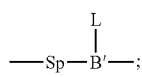

Sp refers group —(CH$_2$)$_n$—, or a group obtained by a —CH$_2$— in the group —(CH$_2$)$_n$— substituted with —O—, —S—, —CO—, —CO—O—, —O—CO—, —O—CO—O—, —OCH$_2$—, —CH$_2$O—, —CH=CH—, —CF=CF—, —C≡C—, —CH=CH—COO—, or —OCO—CH=CH—, wherein n is an integer 1~8;

B' refers

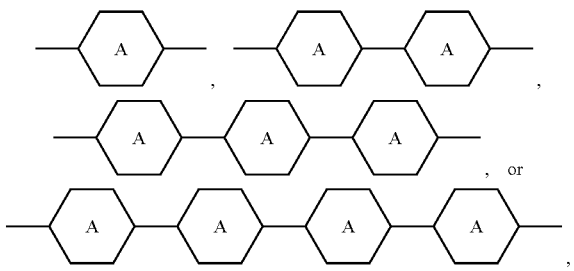

wherein

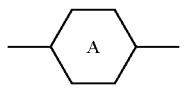

is phenyl, a group obtained by H atom of phenyl substituted with F, Cl, Br, I, —CN, —NO$_2$, or —C(=O)H, or cycloalkyl;

R refers alkyl of straight chain or branched chain having 5~20 C atoms, a first group obtained by a —CH$_2$— in the alkyl substituted with phenyl, cycloalkyl, —CONH—, —COO—, —O—CO—, —S—, —CO—, or —CH=CH—, a second group obtained by an H atom in the alkyl substituted with F or Cl atom, or a third group obtained by an H atom in the first group substituted with F or Cl atom;

L refers a polymerizable group connecting to group B', and includes any one, any two, or any three of following three groups:

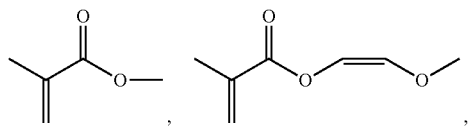

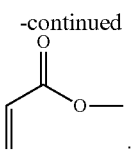

The ligand modifier includes one or more than one of following compounds:

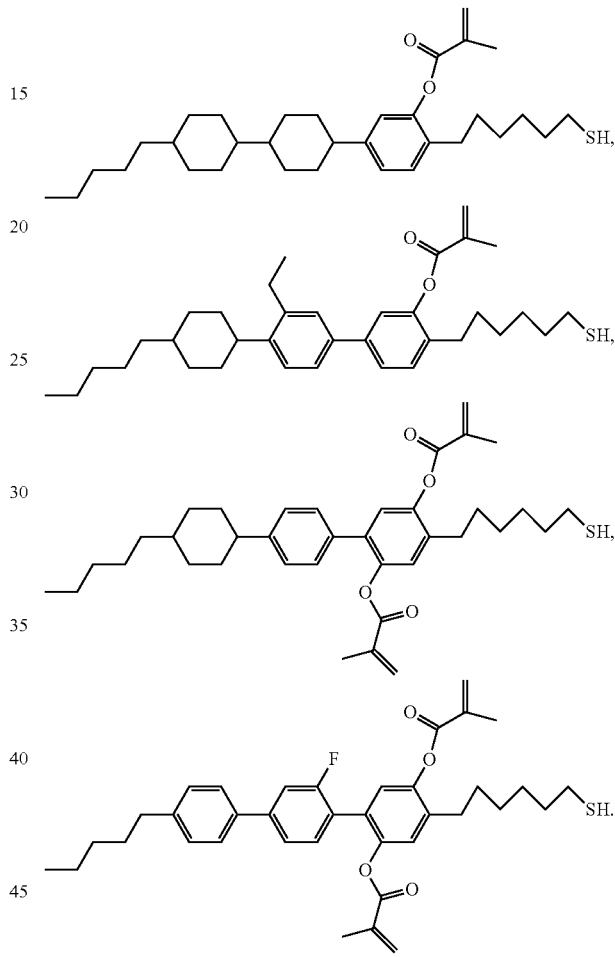

Thicknesses of the first polymer film and the second polymer film are 100~1200 Å.

Advantages of the present application: a ligand-modified quantum dot material provided by the present application can occur a polymerization with the ligand-modified quantum dot material under ultraviolet irradiation to form a polymer, while the polymer deposits on a substrate to form a polymer film, which can replace the PI alignment film, so that an alignment process of liquid crystal is simplified, and a cost is economized; simultaneously, display quality of a liquid crystal display panel can be improved by the quantum dots embedded in the polymer film, and the problems that the quantum dots in the liquid crystal material has uneven diffusion, easily precipitating, and low luminescence efficiency can be solved. A method of fabricating a liquid crystal display panel provided by the present application eliminates the fabricating process of the PI alignment film, the method has simple process and low cost, and a liquid crystal display panel obtained thereby has better display quality. A liquid crystal display panel provided by the present application utilizes the polymer film, which is obtained by polymerizing the ligand-modified quantum dot material and a polymerizable monomer, to replace the PI alignment film; that not only meets the aspect of liquid crystal alignment, but also prevent impurities in the CF substrate to diffuse into the liquid crystal layer, so as to greatly enhance quality of the panel, and to have a low fabricating cost. By introducing the quantum dots material into the polymer film, light source utilization can be increased, color light of higher purity can be obtained, and high color gamut and low power consumption can be achieved.

In order to further understand the technical features and contents of the present application, please refer to the following detailed description and accompanying drawings related to the present application; however, the accompanying drawings are provided only for reference and description, and are not used to limit the present application.

BRIEF DESCRIPTION OF THE DRAWINGS

The technical features and other advantages of the present application will become more readily apparent to those ordinarily skilled in the art, by referring the following detailed description of embodiments of the present application in conjunction with the accompanying drawings.

In the accompanying drawings.

DETAILED DESCRIPTION OF PREFERRED EMBODIMENTS

In order to further clarify the technical means adopted in the present application and the effects thereof, the preferable embodiments of the present application and the accompanying drawings thereof will be more specifically described as follows.

Figure 1:
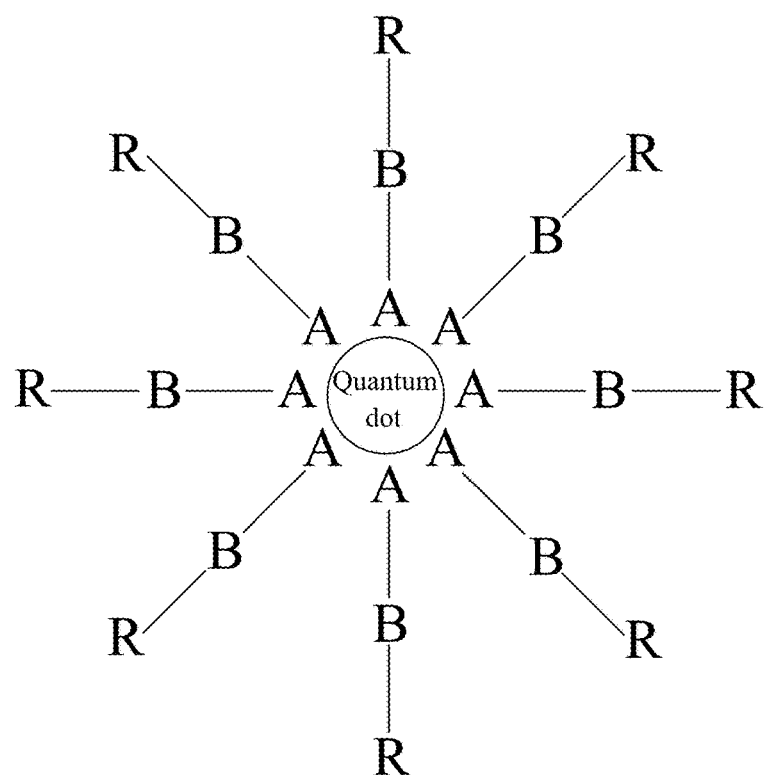
FIG. 1 is a figure schematically illustrating a structure of a ligand-modified quantum dot material of the present application.

Please refer to FIG. 1, the present application provides a ligand-modified quantum dot material, including quantum dots (QDs) and a ligand modifier adsorbing surfaces of the quantum dots; a structural formula of the ligand modifier being A-B-R, the ligand modifier adsorbing the surface of the quantum dots through group A;

wherein A refers —SH, —NH$_2$, —NH—, or —COOH;

B refers

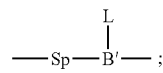

Sp refers group —(CH$_2$)$_n$—, or a group obtained by a —CH$_2$— in the group —(CH$_2$)$_n$— substituted with —O—, —S—, —CO—, —CO—O—, —O—CO—, —O—CO—O—, —OCH$_2$—, —CH$_2$O—, —CH=CH—, —CF=CF—, —C≡C—, —CH=CH—COO—, or —OCO—CH=CH—, wherein n is an integer 1~8;

B' refers

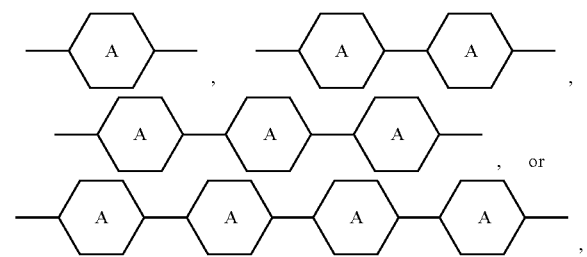

wherein

is phenyl, a group obtained by H atom of phenyl substituted with F, Cl, Br, I, —CN, —NO$_2$, or —C(=O)H, or cycloalkyl;

R refers alkyl of straight chain or branched chain having 5~20 C atoms, a first group obtained by a —CH$_2$— in the alkyl substituted with phenyl, cycloalkyl, —CONH—, —COO—, —O—CO—, —S—, —CO—, or —CH=CH—, a second group obtained by an H atom in the alkyl substituted with F or Cl atom, or a third group obtained by an H atom in the first group substituted with F or Cl atom;

L refers a polymerizable group connecting to group B', and includes any one, an two, or any three of following three groups:

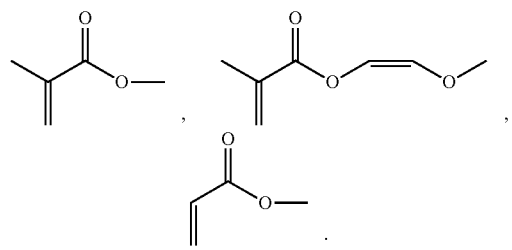

Specifically, the ligand-modified quantum dot material 32 includes a polymerizable group L, so that the ligand-modified quantum dot material 32 can occur a reaction with polymerizable monomers in the liquid crystal material, to form a polymer film, so that the quantum dots are anchored in the polymer film, to solve the problem that the quantum dot material is easily precipitated in the liquid crystal.

Specifically, the ligand modifier includes one or more than one of following compounds:

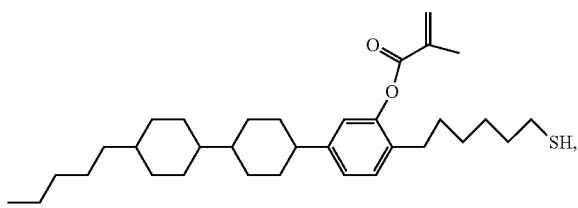

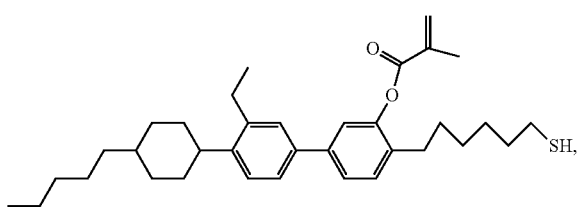

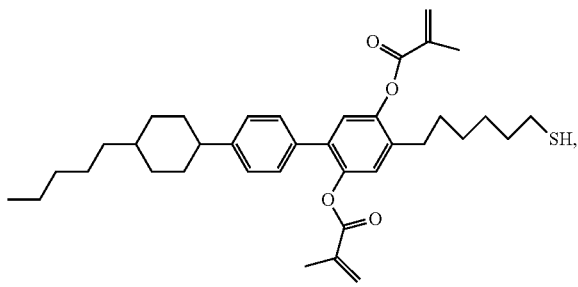

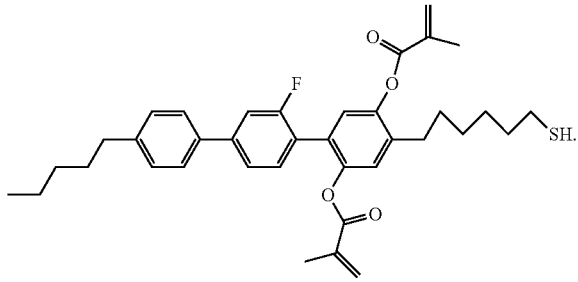

Specifically, the quantum dots are one of CdX, PbX, ZnX, HgX, GaX, and InX, or a shell structure formed by a combination of more than one of CdX, PbX, ZnX, HgX, GaX, and InX, wherein X is S, Se, or Te. Specifically, a size of the quantum dots is 1-30 nm.

Figure 2:
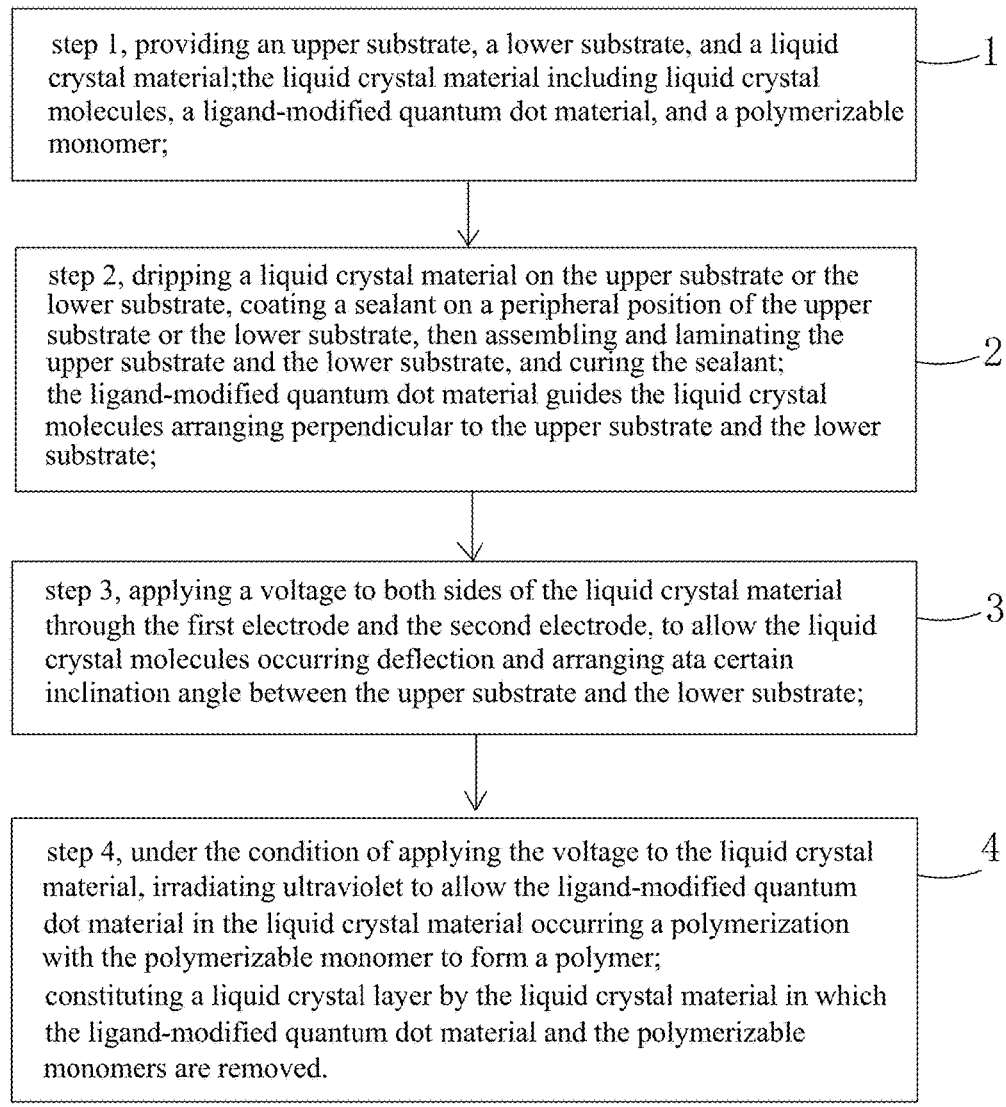
FIG. 2 is a flow chart schematically illustrating a method of fabricating a liquid crystal display panel of the present application.

Please refer to FIG. 2, the present application further provides a method of fabricating a liquid crystal display panel, including following steps.

Figure 3:
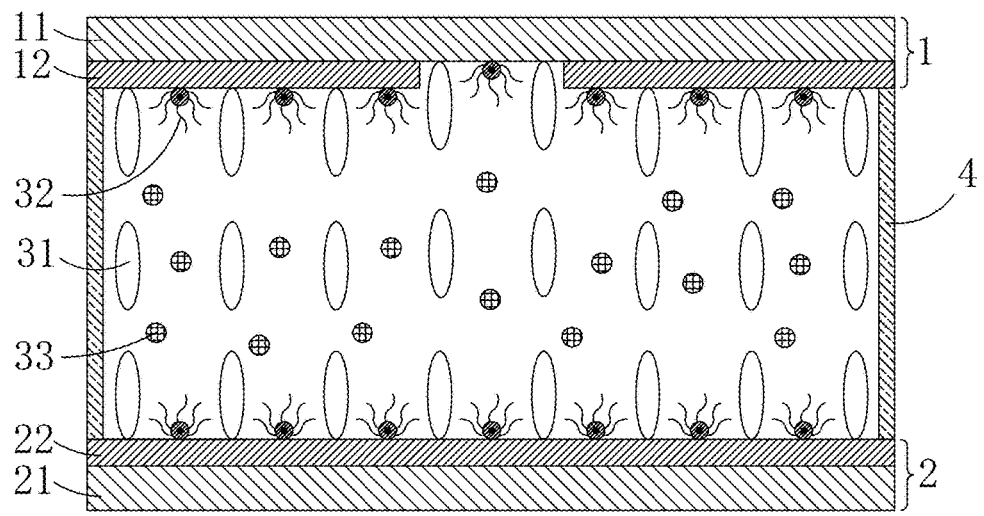
FIG. 3 is a figure schematically illustrating step 1-2 of the method of fabricating the liquid crystal display panel of the present application.

Step 1, please refer to FIG. 3, providing an upper substrate 1, a lower substrate 2, and a liquid crystal material.

The upper substrate 1 includes a first substrate 11, and a first electrode 12 is disposed on the first substrate 11; the lower substrate 2 includes a second substrate 21, and a second electrode 22 is disposed on the second substrate 21.

The liquid crystal material includes liquid crystal molecules 31, a ligand-modified quantum dot material 32, and a polymerizable monomer (RM) 33.

The ligand-modified quantum dot material 32 includes quantum dots (QDs), and a ligand modifier adsorbing surfaces of the quantum dots; a structural formula of the ligand modifier is A-B-R, the ligand modifier adsorbs the surfaces of the quantum dots through group A;

wherein A refers —SH, —NH$_2$, —NH—, or —COOH;

B refers

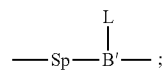

Sp refers group —(CH$_2$)$_n$—, or a group obtained by a —CH$_2$— in the group —(CH$_2$)$_n$— substituted with —O—, —S—, —CO—, —CO—O—, —O—CO—, —O—CO—O—, —OCH$_2$—, —CH$_2$O—, —CH=CH—, —CF=CF—, —C≡C—, —CH=CH—COO—, or —OCO—CH=CH—, wherein n is an integer 1~8;

B' refers

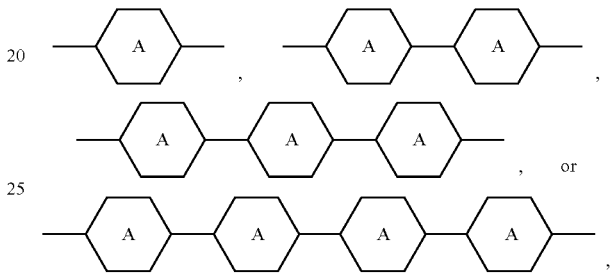

wherein

is phenyl, a group obtained by H atom of phenyl substituted with F, Cl, Br, I, —CN, —NO$_2$, or —C(=O)H, or cycloalkyl;

R refers alkyl of straight chain or branched chain having 5~20 C atoms, a first group obtained by a —CH$_2$— in the alkyl substituted with phenyl, cycloalkyl, —CONH—, —COO—, —O—CO—, —S—, —CO—, or —CH=CH—, a second group obtained by an H atom in the alkyl substituted with F or Cl atom, or a third group obtained by an H atom in the first group substituted with F or Cl atom;

L refers a polymerizable group connecting to group B', and includes any one, any two, or any three of following three groups:

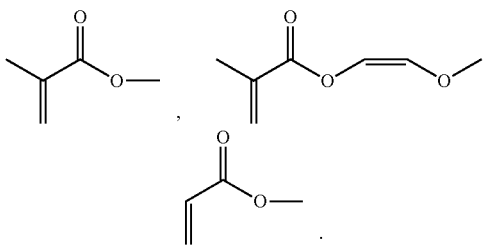

Specifically, the ligand modifier includes one or more than one of following compounds:

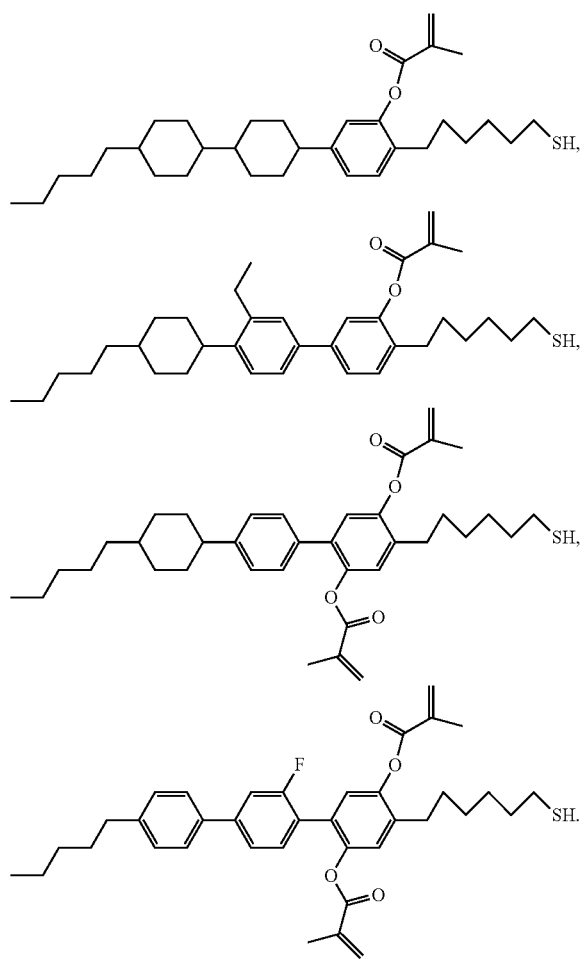

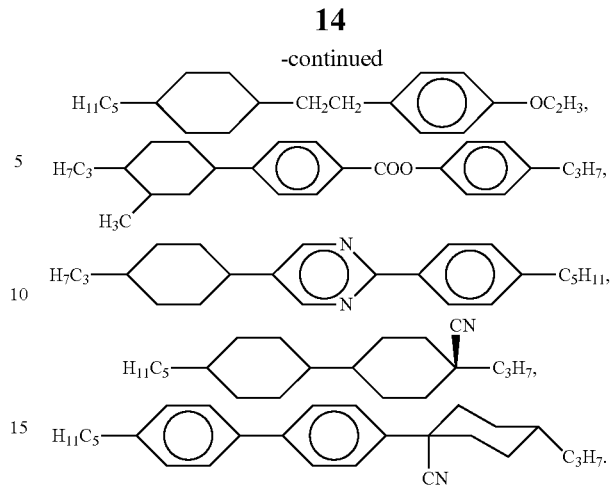

Specifically, the quantum dots are one of CdX, PbX, ZnX, HgX, GaX, and InX, or a shell structure formed by a combination of more than one of CdX, PbX, ZnX, HgX, GaX, and InX, wherein X is S, Se, or Te. Specifically, a size of the quantum dots is 1-30 nm.

Specifically, in the liquid crystal material, a mass percentage of the liquid crystal molecules 31 is 93.0%~99.4%, a mass percentage of the ligand-modified quantum dot material 32 is 0.5%~5.0%, a mass percentage of the polymerizable monomer 33 is 0.01%~2.0%.

Specifically, the polymerizable monomer 33 includes one or a combination of more than one of acrylates, acrylate derivatives, methacrylates, methacrylate derivatives, styrene, styrene derivatives, and epoxy resin; wherein the epoxy resin can be fatty amine base epoxy resins.

Preferably, the liquid crystal material further includes a photo initiator, and a mass percentage of the photo initiator is 0.14%~0.5%.

Specifically, the photo initiator includes one or a combination of more than one of azobisisobutyronitrile, dialkyl peroxide base compounds, diacyl peroxide base compounds, and lipid peroxide base compound.

Specifically, the liquid crystal molecules 31 include one or more than one of following compounds:

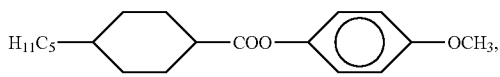

Specifically, the upper substrate 1 and the lower substrate respectively are a TFT substrate and a CF substrate; the first electrode 12 and the second electrode respectively are a pixel electrode and a common electrode.

Step 2, please refer to FIG. 3, dripping a liquid crystal material on the upper substrate 1 or the lower substrate 2, coating a sealant 4 on a peripheral position of the upper substrate 1 or the lower substrate 2, then assembling and laminating the upper substrate 1 and the lower substrate 2, and curing the sealant 4.

Due the ligand-modified quantum dot material 32 in the liquid crystal material is hard to be soluble in liquid crystal molecules 31, the ligand-modified quantum dot material 32 thus deposits on the upper substrate 1 and the lower substrate 2, and the ligand-modified quantum dot material 32 guides the liquid crystal molecules 31 arranging perpendicular to the upper substrate 1 and the lower substrate 2 through middle and tail groups B-R on the ligand modifier.

Preferably, in step 2, after the sealant 4 is coated on the peripheral position of the upper substrate 1 or the lower substrate 2, an electric conductive adhesive (not shown) is coated on a periphery of the sealant 4.

Preferably, in step 2, the upper substrate 1 and the substrate 2 are assembled and laminated in a vacuum environment.

Specifically, in step 2, curing the sealant 4 is utilized a method of heating or ultraviolet (UV) irradiation.

Figure 4:
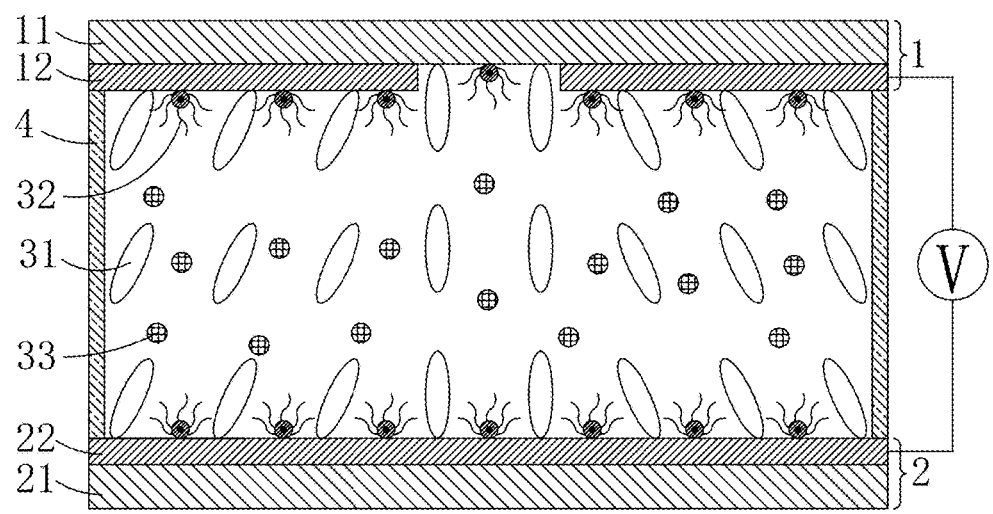
FIG. 4 is a figure schematically illustrating step 3 of the method of fabricating the liquid crystal display panel of the present application.

Step 3, as shown in FIG. 4, applying a voltage to both sides of the liquid crystal material through the first electrode 11 and the second electrode 21, to allow the liquid crystal molecules 31 occurring deflection and arranging along a direction inclined to the upper substrate 1 and the lower substrate 2.

Specifically, in step 3, the voltage applied to the both sides of the liquid crystal material is 13~25V.

Figure 5:
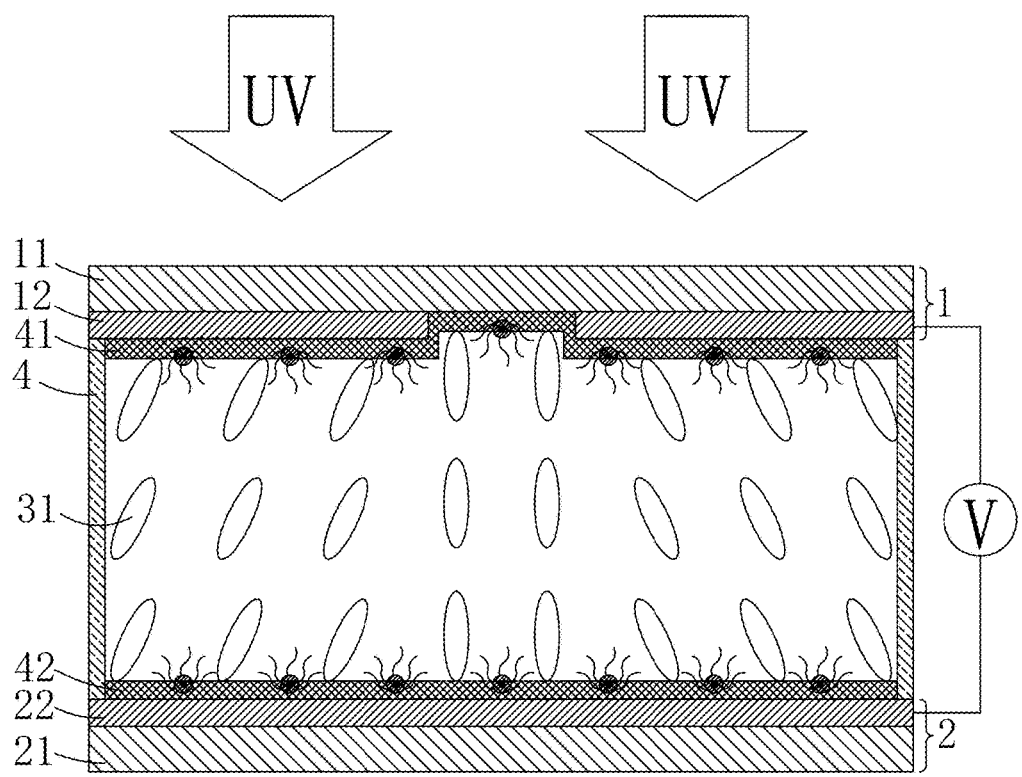
FIG. 5 is a figure schematically illustrating step 4 of the method of fabricating the liquid crystal display panel of the present application.

Step 4, as shown in FIG. 5, under the condition of applying the voltage to the liquid crystal material, irradiating ultraviolet to the liquid crystal material from a side of the upper substrate 1 or the lower substrate 2, to allow the ligand-modified quantum dot material 32 in the liquid crystal material occurring a polymerization with the polymerizable monomer 33 through the ligand modifier on the ligand-modified quantum dot material 32 to form a polymer, wherein the polymer deposits on the upper substrate 1 toward a side of the liquid crystal material to form a first polymer film 41, and simultaneously deposits on the lower substrate 2 toward a side of the liquid crystal material to form a second polymer film 42, surfaces of both the first polymer film 41 and the second polymer film 42 have polymer projections, so as to allow the liquid crystal molecules around the first polymer film 41 and the second polymer film 42 maintain the inclined direction thereof in a steric hindrance manner, after the voltage is removed, and an alignment of the liquid crystal molecules 31 is achieved.

Figure 6:
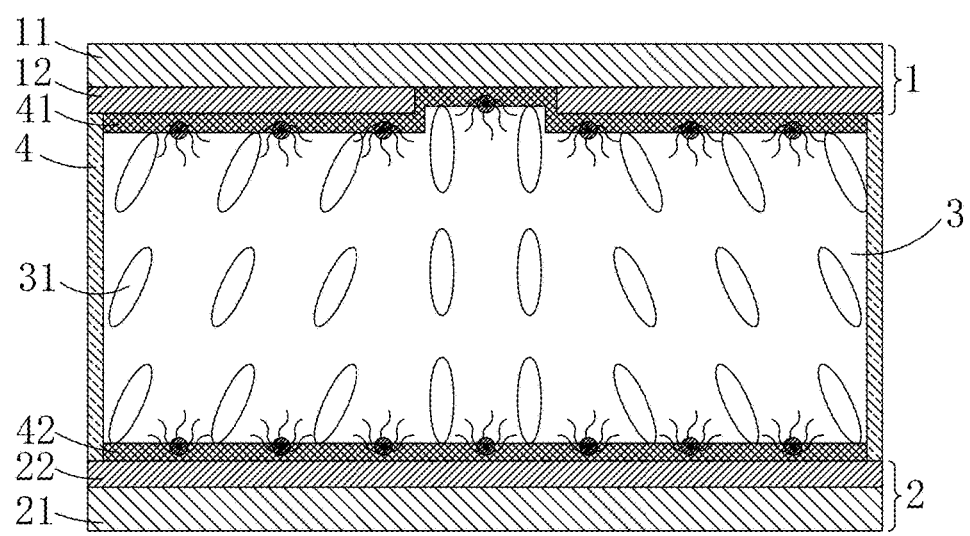
FIG. 6 is a figure schematically illustrating a structure of a liquid crystal display panel of the present application.

As shown in FIG. 6, the liquid crystal material in which the ligand-modified quantum dot material 32 and the polymerizable monomers 33 are removed constitutes a liquid crystal layer 3, the fabrication of the liquid crystal display panel is completed.

Specifically, in the irradiating ultraviolet of step 4, an illumination intensity of the ultraviolet is 85~100 mW/cm², an irradiation time is 20~30 min.

Preferably, in step 4, ultraviolet irradiates the liquid crystal material from the side of the upper substrate (i.e. TFT substrate). Because the TFT substrate has a higher transmittance compared to the CF substrate, UV transmittance can be increased, and an effect of UV irradiation can be enhanced.

Figure 7:
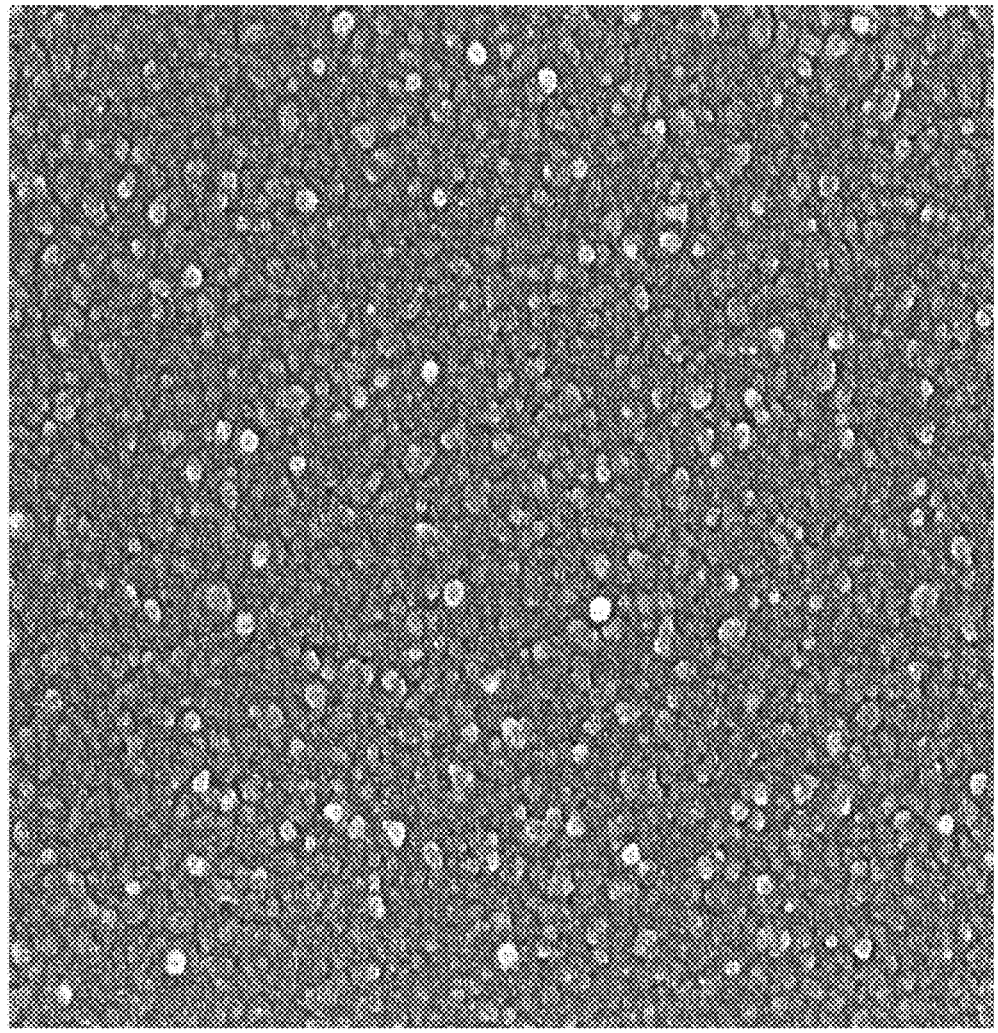
FIG. 7 is a scanning electron microscope picture schematically illustrating surface topographies of a first polymer film and a second polymer film in the liquid crystal display panel shown in FIG. 6.

Specifically, thicknesses of the first polymer film 41 and the second polymer film 42 are 100~1200 Å. FIG. 7 is a scanning electron microscope picture schematically illustrating surface topographies of a first polymer film 41 and a second polymer film 42, as shown in FIG. 7, both the first polymer film 41 and the second polymer film have rough surfaces.

Please refer to FIG. 6, the present application further provides a liquid crystal display panel, including: oppositely disposed an upper substrate 1 and a lower substrate 2, a liquid crystal layer 3 disposed between the upper substrate 1 and the lower substrate 2, a first polymer film 41 disposed on the upper substrate 1 toward a side surface of the liquid crystal layer 3, and a second polymer film 42 disposed on the lower substrate 2 toward a side surface of the liquid crystal layer 3; wherein the upper substrate 1 includes a first substrate 11 and a first electrode 12 disposed on the first substrate 11; the lower substrate 2 includes a second substrate 21 and a second electrode 22 disposed on the second substrate 21.

The liquid crystal layer 3 includes liquid crystal molecules 31.

Both the first polymer film 41 and the second polymer film 42 are formed by polymerizing the polymerizable monomer 33 and the ligand-modified quantum dot material 32, and surfaces of both the first polymer film 41 and the second polymer film 42 have polymer projections, so as to allow the liquid crystal molecules 31 have a pre-inclination angle; that is, the liquid crystal molecules 31 in the liquid crystal layer 3 near the first polymer film 41 and the second polymer film 42 arrange along a direction inclined to the upper substrate 1 and the lower substrate 2.

The ligand-modified quantum dot material 32 includes quantum dots (QDs), and a ligand modifier adsorbs surfaces of the quantum dots; a structural formula of the ligand modifier is A-B-R, the ligand modifier adsorbs the surface of the quantum dots through group A;

wherein A refers —SH, —NH₂, —NH—, or —COOH;
B refers

—S—, —CO—, —CO—O—, —O—CO—, —O—CO—O—, —OCH₂—, —CH₂O—, —CH=CH—, —CF=CF—, —C≡C—, —CH=CH—COO—, or —OCO—CH=CH—, wherein n is an integer 1~8;

B' refers

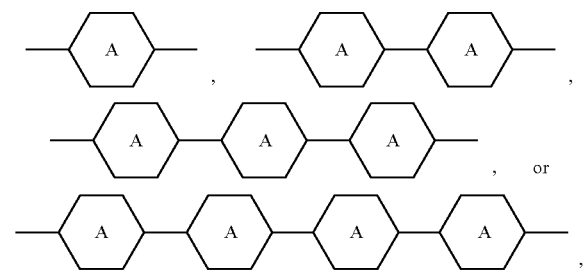

wherein

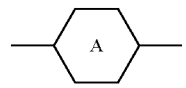

is phenyl, a group obtained by H atom of phenyl substituted with F, Cl, Br, I, —CN, —NO₂, or —C(=O)H, or cycloalkyl;

R refers alkyl of straight chain or branched chain having 5~20 C atoms, a first group obtained by a —CH₂— in the alkyl substituted with phenyl, cycloalkyl, —CONH—, —COO—, —O—CO—, —S—, —CO—, or —CH=CH—, a second group obtained by an H atom in the alkyl substituted with F or Cl atom, or a third group obtained by an H atom in the first group substituted with F or Cl atom;

L refers a polymerizable group connecting to group B', and includes any one, any two, or any three of following three groups:

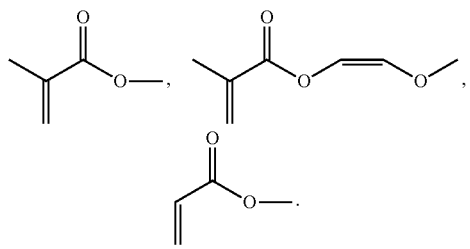

Specifically, the ligand modifier includes one or more than one of following compounds:

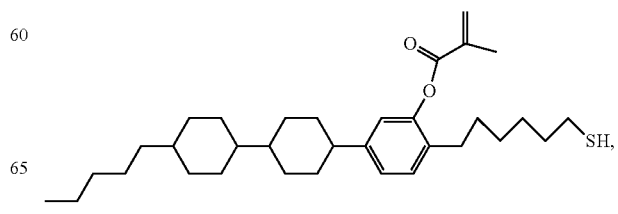

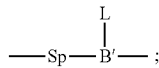

Sp refers group —(CH₂)ₙ—, or a group obtained by a —CH₂— in the group —(CH₂)ₙ— substituted with —O—, -continued

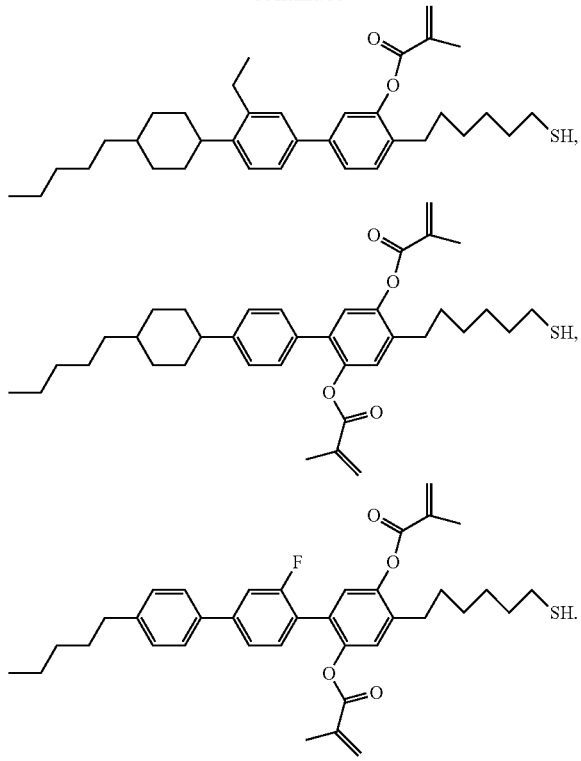

Specifically, the quantum dots are one of CdX, PbX, ZnX, HgX, GaX, and InX, or a shell structure formed by a combination of more than one of CdX, PbX, ZnX, HgX, GaX, and InX, wherein X is S, Se, or Te. Specifically, a size of the quantum dots is 1-30 nm.

Specifically, thicknesses of the first polymer film 41 and the second polymer film 42 are 100~1200 Å. FIG. 7 is a scanning electron microscope picture schematically illustrating surface topographies of a first polymer film 41 and a second polymer film 42, as shown in FIG. 7, both the first polymer film 41 and the second polymer film have rough surfaces.

Specifically, the polymerizable monomer 33 includes one or a combination of more than one of acrylates, acrylate derivatives, methacrylates, methacrylate derivatives, styrene, styrene derivatives, and epoxy resin; wherein the epoxy resin can be fatty amine base epoxy resins.

Specifically, the liquid crystal molecules 31 include one or more than one of following compounds:

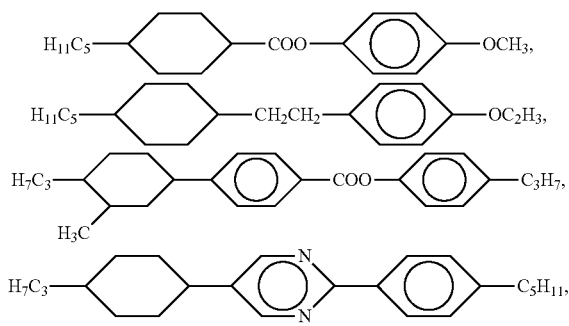

-continued

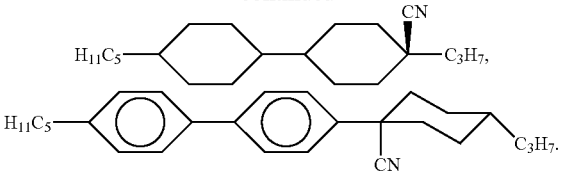

Specifically, the liquid crystal display panel further includes a sealant 4 disposed between the upper substrate 1 and the lower substrate 2 and located at periphery of the liquid crystal layer 3. Preferably, the liquid crystal display panel further includes an electric conductive adhesive (not shown) is located at a periphery of the sealant 4.

Specifically, the upper substrate 1 and the lower substrate respectively are a TFT substrate and a CF substrate; the first electrode 12 and the second electrode respectively are a pixel electrode and a common electrode.

In summary, the present application provides a ligand-modified quantum dot material, a method of fabricating a liquid crystal display panel, and a liquid crystal display panel. The ligand-modified quantum dot material of the present application can occur a polymerization with the ligand-modified quantum dot material under ultraviolet irradiation to form a polymer, while the polymer deposits on a substrate to form a polymer film, which can replace the PI alignment film, so that an alignment process of liquid crystal is simplified, and a cost is economized; simultaneously, display quality of a liquid crystal display panel can be improved by the quantum dots embedded in the polymer film, and the problems that the quantum dots in the liquid crystal material has uneven diffusion, easily precipitating, and low luminescence efficiency can be solved. The method of fabricating the liquid crystal display panel of the present application eliminates the fabricating process of the PI alignment film, the method has simple process and low cost, and a liquid crystal display panel obtained thereby has better display quality. The liquid crystal display panel of the present application utilizes the polymer film, which is obtained by polymerizing the ligand-modified quantum dot material and a polymerizable monomer, to replace the PI alignment film; that not only meets the aspect of liquid crystal alignment, but also prevent impurities in the CF substrate to diffuse into the liquid crystal layer, so as to greatly enhance quality of the panel, and to have a low fabricating cost. By introducing the quantum dots material into the polymer film, light source utilization can be increased, color light of higher purity can be obtained, and high color gamut and low power consumption can be achieved.

The above description, for an ordinarily skilled in the art, he can complete various similar modifications and arrangements according to the technical programs and ideas of the present application, and the scope of the appended claims of the present application should encompass all such modifications and arrangements.

What is claimed is:

1. A ligand-modified quantum dot material, comprising quantum dots and a ligand modifier; wherein a structural formula of the ligand modifier is A-B-R, and the ligand modifier is adsorbed onto surface of the quantum dots through group A;

wherein A represents —SH, —NH$_2$, —NH—, or —COOH;

B represents

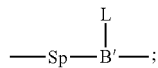

Sp represents group —(CH$_2$)$_n$—, or the group —(CH$_2$)$_n$— having one —CH$_2$— substituted with —O—, —S—, —CO—, —CO—O—, —O—CO—, —O—CO—O—, —OCH$_2$—, —CH$_2$O—, —CH=CH—, —CF=CF—, —C≡C—, —CH=CH—COO—, or —OCO—CH=CH—, wherein n is an integer from 1 to 8;

B' represents

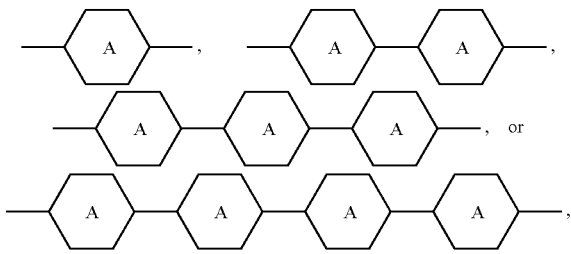

wherein

is phenyl, a group obtained by H atom of phenyl substituted with F, Cl, Br, I, —CN, —NO$_2$, or —C(=O)H, or cycloalkyl;

R represents alkyl of straight chain or branched chain having from 5 to 20 C atoms, a first group obtained by a —CH$_2$— in the alkyl substituted with phenyl, cycloalkyl, —CONH—, —COO—, —O—CO—, —S—, —CO—, or —CH=CH—, a second group obtained by an H atom in the alkyl substituted with F or Cl atom, or a third group obtained by an H atom in the first group substituted with F or Cl atom;

L represents a polymerizable group connecting to group B', and comprises any one, any two, or three of following three groups:

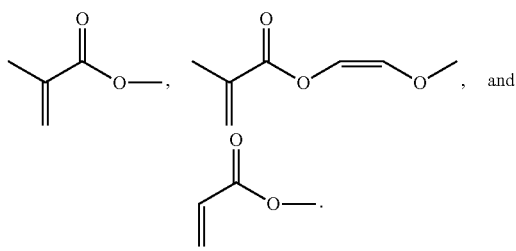

2. The ligand-modified quantum dot material according to claim 1, wherein the ligand modifier comprises one or more than one of following compounds:

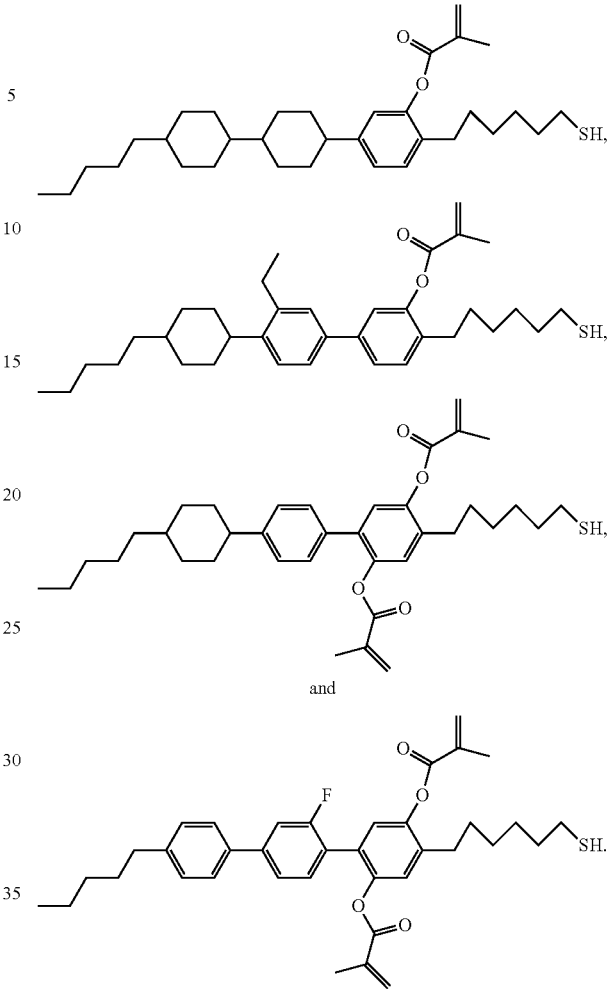

and

3. A method of fabricating a liquid crystal display panel, comprising following steps:
step 1, providing an upper substrate, a lower substrate, and a liquid crystal material;
the upper substrate comprising a first substrate, and a first electrode disposed on the first substrate; the lower substrate comprising a second substrate, and a second electrode disposed on the second substrate;
the liquid crystal material comprising liquid crystal molecules, a ligand-modified quantum dot material, and a polymerizable monomer;
the ligand-modified quantum dot material comprising quantum dots and a ligand modifier; wherein a structural formula of the ligand modifier is A-B-R, and the ligand modifier is adsorbed onto surface of the quantum dots through group A;
wherein A refers —SH, —NH$_2$, —NH—, or —COOH;
B represents

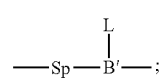

Sp represents group —(CH$_2$)$_n$—, or the group —(CH$_2$)$_n$— having one —CH$_2$— substituted with —O—, —S—, —CO—, —CO—O—, —O—CO—, —O—CO—O—, —OCH$_2$—, —CH$_2$O—, —CH=CH—, —CF=CF—, —C≡C—, —CH=CH—COO—, or —OCO—CH=CH—, wherein n is an integer from 1 to 8;

B' represents

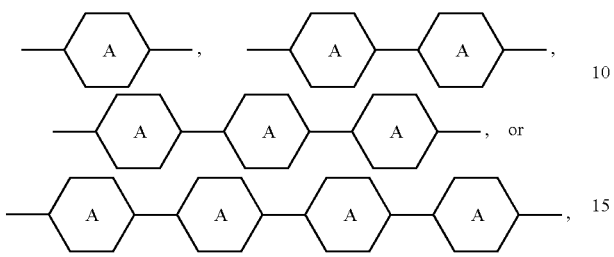

wherein

is phenyl, a group obtained by H atom of phenyl substituted with F, Cl, Br, I, —CN, —NO$_2$, or —C(=O)H, or cycloalkyl;

R represents alkyl of straight chain or branched chain having from 5 to 20 C atoms, a first group obtained by a —CH$_2$— in the alkyl substituted with phenyl, cycloalkyl, —CONH—, —COO—, —O—CO—, —S—, —CO—, or —CH=CH—, a second group obtained by an H atom in the alkyl substituted with F or Cl atom, or a third group obtained by an H atom in the first group substituted with F or Cl atom;

L represents a polymerizable group connecting to group B', and comprises any one, any two, or three of following three groups:

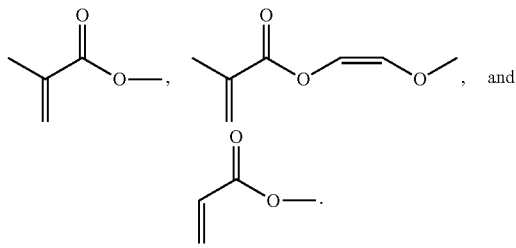

step 2, dripping the liquid crystal material on the upper substrate or the lower substrate, coating a sealant on a peripheral position of the upper substrate or the lower substrate, then assembling and laminating the upper substrate and the lower substrate, and curing the sealant;

wherein the ligand-modified quantum dot material deposits on the upper substrate and the lower substrate, and the ligand modified quantum dot material to guide the liquid crystal molecules perpendicular to the upper substrate and the lower substrate through group B-R on the ligand modifier;

step 3, applying a voltage to both sides of the liquid crystal material through the first electrode and the second electrode, to allow the liquid crystal molecules occurring deflection and arranging along a direction inclined to the upper substrate and the lower substrate;

step 4, irradiating ultraviolet to the liquid crystal material under the voltage from either side of the upper substrate or the lower substrate, to allow the ligand-modified quantum dot material polymerizing with the polymerizable monomer to form a first polymer film, a second polymer film, and to deplete the ligand-modified quantum material and polymerizable monomer in the liquid crystal material to form a liquid crystal layer; wherein the first polymer film is disposed between the upper substrate and the liquid crystal layer, and the second polymer film is disposed between the lower substrate and the liquid crystal layer, and the polymer films have polymer projections to maintain the inclined direction by steric hindrance after the voltage being removed;

constituting a liquid crystal layer by the liquid crystal material in which the ligand-modified quantum dot material and the polymerizable monomers are removed.

4. The method of fabricating the liquid crystal display panel according to claim 3, wherein the ligand modifier comprises one or more than one of following compounds:

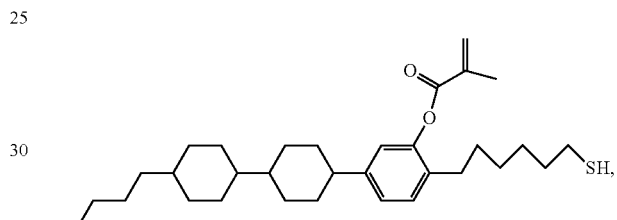

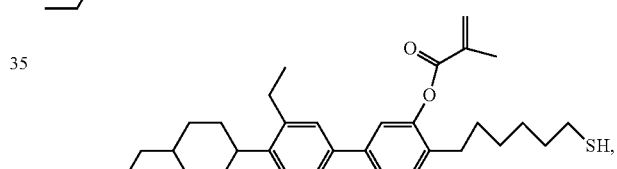

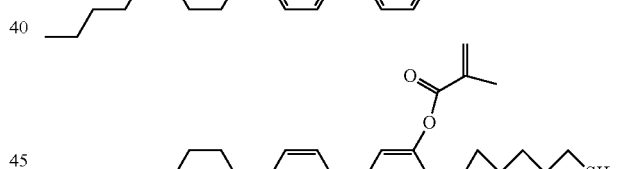

and

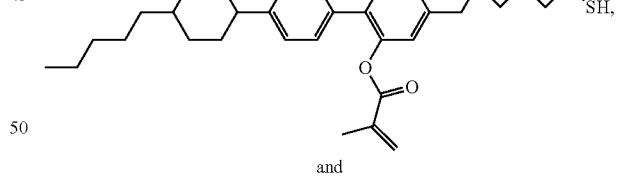

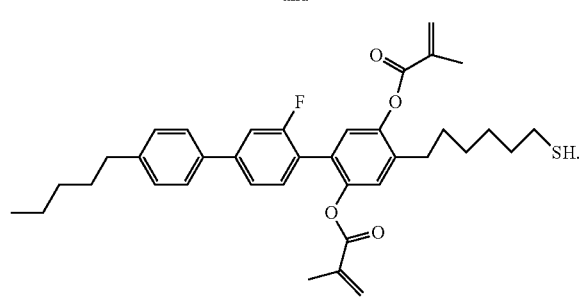

5. The method of fabricating the liquid crystal display panel according to claim 3, wherein, in the liquid crystal material, a mass percentage of the liquid crystal molecules is from 93.0% to 99.4%, a mass percentage of the ligand-modified quantum dot material is from 0.5% to 5.0%, a mass percentage of the polymerizable monomer is from 0.01% to 2.0%.

6. The method of fabricating the liquid crystal display panel according to claim 3, wherein the voltage applied to the both sides of the liquid crystal material is from 13 to 25V; and an illumination intensity of the ultraviolet is from 85 to 100 mW/cm$^2$, an irradiation time is from 20 to 30 min.

7. The method of fabricating the liquid crystal display panel according to claim 3, wherein thicknesses of the first polymer film and the second polymer film are from 100 to 1200 Å.

8. A liquid crystal display panel, comprising: oppositely disposed an upper substrate and a lower substrate, a liquid crystal layer disposed between the upper substrate and the lower substrate, a first polymer film disposed between the upper substrate and the liquid crystal layer, and a second polymer film disposed between the lower substrate and the liquid crystal layer; wherein the upper substrate comprises a first substrate and a first electrode disposed on the first substrate; the lower substrate comprises a second substrate and a second electrode disposed on the second substrate; the liquid crystal layer comprises liquid crystal molecules; both the first polymer film and the second polymer film are formed by polymerizing the polymerizable monomer and the ligand-modified quantum dot material, and surfaces of both the first polymer film and the second polymer film have polymer projections, so as to allow the liquid crystal molecules near the first polymer film and the second polymer film arrange along a direction inclined to the upper substrate and the lower substrate; the ligand-modified quantum dot material comprises quantum dots and a ligand modifier; wherein a structural formula of the ligand modifier is A-B-R, and the ligand modifier is adsorbed onto surface of the quantum dots through group A;

wherein A represents —SH, —NH$_2$, —NH—, or —COOH;

B represents

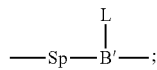

Sp represents group —(CH$_2$)$_n$—, or the group —(CH$_2$)$_n$— having one —CH$_2$— substituted with —O—, —S—, —CO—, —CO—O—, —O—CO—, —O—CO—O—, —OCH$_2$—, —CH$_2$O—, —CH=CH—, —CF=CF—, —C≡C—, —CH=CH—COO—, or —OCO—CH=CH—, wherein n is an integer from 1 to 8;

B' represents

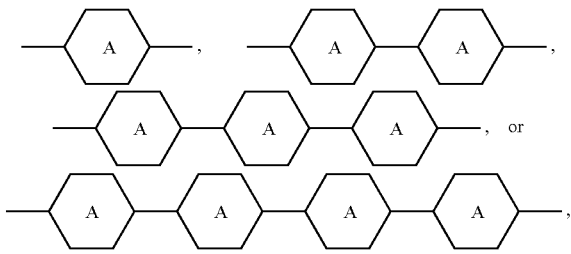

wherein

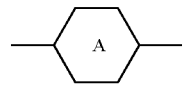

is phenyl, a group obtained by H atom of phenyl substituted with F, Cl, Br, I, —CN, —NO$_2$, or —C(=O)H, or cycloalkyl;

R represents alkyl of straight chain or branched chain having from 5 to 20 C atoms, a first group obtained by a —CH$_2$— in the alkyl substituted with phenyl, cycloalkyl, —CONH—, —COO—, —O—CO—, —S—, —CO—, or —CH=CH—, a second group obtained by an H atom in the alkyl substituted with F or Cl atom, or a third group obtained by an H atom in the first group substituted with F or Cl atom;

L represents a polymerizable group connecting to group B', and comprises any one, any two, or three of following three groups:

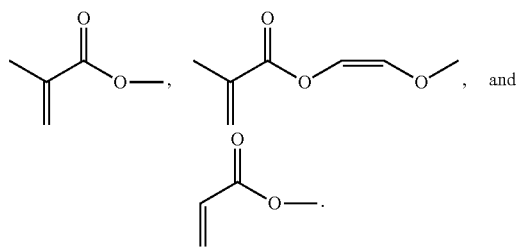

9. The liquid crystal display panel according to claim 8, wherein the ligand modifier comprises one or more than one of following compounds:

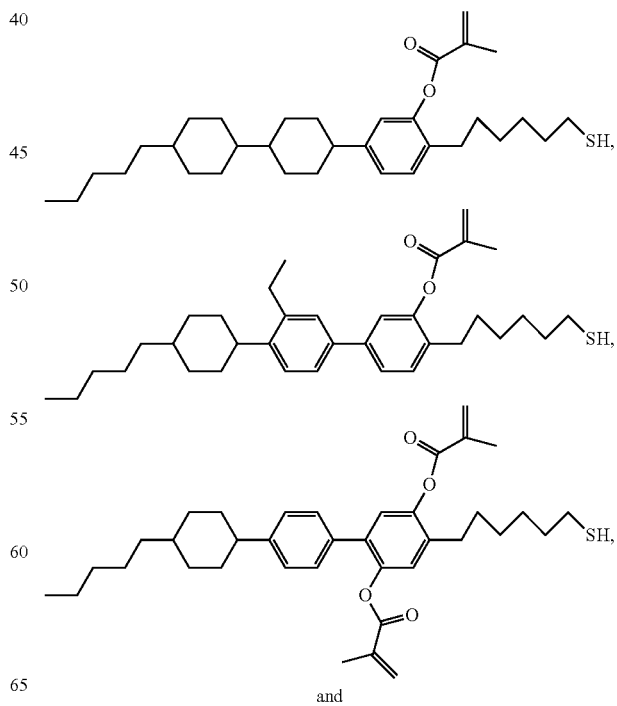

and

-continued
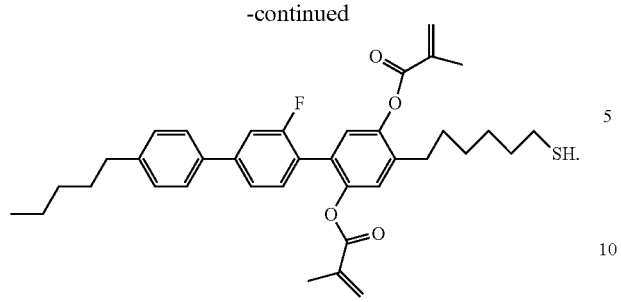
10. The liquid crystal display panel according to claim 8, wherein thicknesses of the first polymer film and the second polymer film are from 100 to 1200 Å.
* * * * *